United States Patent [19]

Nakanishi

[11] Patent Number: 4,619,510
[45] Date of Patent: Oct. 28, 1986

[54] CAMERA

[75] Inventor: Kazuhiro Nakanishi, Hachioji, Japan

[73] Assignee: Konishiroku Photo Industry Co., Ltd., Tokyo, Japan

[21] Appl. No.: 759,641

[22] Filed: Jul. 26, 1985

[30] Foreign Application Priority Data

Jul. 27, 1984 [JP] Japan ................................ 59-158457
Jul. 27, 1984 [JP] Japan ................................ 59-158458
Jul. 27, 1984 [JP] Japan ................................ 59-158459
Aug. 7, 1984 [JP] Japan ................................ 59-166281

[51] Int. Cl.$^4$ ............................................. G03B 1/18
[52] U.S. Cl. .................................. 354/173.1; 354/214
[58] Field of Search .................... 354/190, 195, 173.1, 354/173.11, 187, 202, 214

[56] References Cited

U.S. PATENT DOCUMENTS

| | | | |
|---|---|---|---|
| 3,485,156 | 12/1969 | Takahashi et al. | 354/214 |
| 3,882,515 | 5/1975 | Mueller | 354/173.1 |
| 3,994,003 | 11/1976 | Iwashita et al. | 354/173.11 |
| 4,350,423 | 9/1982 | Engelsmann et al. | 354/195.1 X |
| 4,419,001 | 12/1983 | Tominaga et al. | 354/173.1 |

Primary Examiner—Donald A. Griffin
Attorney, Agent, or Firm—Jordan B. Bierman

[57] ABSTRACT

The present invention relates to a camera that is capable of automatically operating the wind/rewind of film and the lens movement required for the focal length change or collapse of the taking lens thereof.

18 Claims, 2 Drawing Figures

FIG. I

CAMERA

BACKGROUND OF THE INVENTION

In small-sized cameras, particularly compact-type cameras that use 35 mm roll film (J135), those which, in addition to its automated exposure and focusing, is capable of automatically operating also the wind and rewind of film by a built-in motor have already been on the market, but in recent years, to such compact-type cameras, there also has been made a proposal of a camera equipped with a taking lens whose focal length is changeable in two steps, the so-called "double-focus lens.

In the double-focus lens, the change of the focal length, in order to keep the focal point on the surface of film simultaneously with the attaching/detaching of a conversion lens, requires an operation of moving the taking lens in its optical axis direction.

In a camera having a lens movable in its optical axis direction, such as a variable-focus camera or a collapsible mount-type camera designed so as to have its lens collapse when not in use and protrude when photographing, if an attempt is made to have this operation made by a motor, a lensmoving mechanism is required in addition to the conventional mechanism, thus causing the camera to be of a large size, bulky to carry about for photographing.

As for the drive mechanism capable of arbitrarily changing the lens-moving operation as well as of winding/rewinding film by a same single motor, there have been several proposals, but they sophisticate the mechanism to complicate handling and also make it difficult to obtain means to automatically initiate the rewind of film upon completion of the use of film, and thus it is the status quo that there are still no complete ones as the drive mechanism for full automatic cameras.

OBJECTS AND SUMMARY OF THE INVENTION

The present invention has been made to solve the abovestated existing disadvantages and pending problems.

It is therefore an object of the present invention to provide a camera miniaturized overall by making the lens-moving mechanism thereof compact.

It is another object of the present invention to simplify the complex structure of the conventional lens-moving-type camera-drive mechanism to improve the troublesome handling thereof by providing a changeover mechanism to improve the operability and to ensure the changeover of the operations of moving the lens back and forth and winding and rewinding film, thereby accomplishing also the function of automatically initiating the rewind of film.

The present invention is to accomplish the above objects by providing a camera comprising a single motor whose driving force is transmitted selectively through a changeover mechanism to either the film-transport mechanism or the lens-moving mechanism for moving the taking lens in its optical axis direction.

The driving force-transmitting mechanism in the camera of this invention, as stated above, is such that, in a camera wherein the film-wind, film-rewind and lens-moving operations thereof are effected by a same single motor, the switch member for the film-rewind operation or the lens-moving operation, both driven by the driving force of a single motor, is provided so as to be turned ON by either one of the film-rewind operation member or the lens-moving operation member of the camera.

The lens-moving device in the camera of this invention comprises a reciprocating operation member to move the lens, a switch member to start the foregoing member, and a changeover mechanism to transmit the driving force of the motor selectively to the film-wind mechanism or film-rewind mechanism and lens-moving mechanism, and in the advance operation of the above operation member, the changeover mechanism is effected to make the motor's driving force transmittable to the lens-moving mechanism, and, in the return operation, the changeover mechanism is effected to turn the foregoing switch member ON to drive the motor to thus perform the movement of the lens.

Further, in order to provide a function of automatically starting the rewind of film, the camera of this invention is so constructed that, in its camera driving device having changeover means to transmit the single motor's driving force by use of a planet gear mechanism selectively to the film-transport mechanism or to the taking lens-moving mechanism, the above changeover means is provided with a resiliently biasing means for the purpose of engaging the same means with the above film-transport mechanism.

DESCRIPTION OF THE PREFERRED EMBODIMENTS

Figure 1:
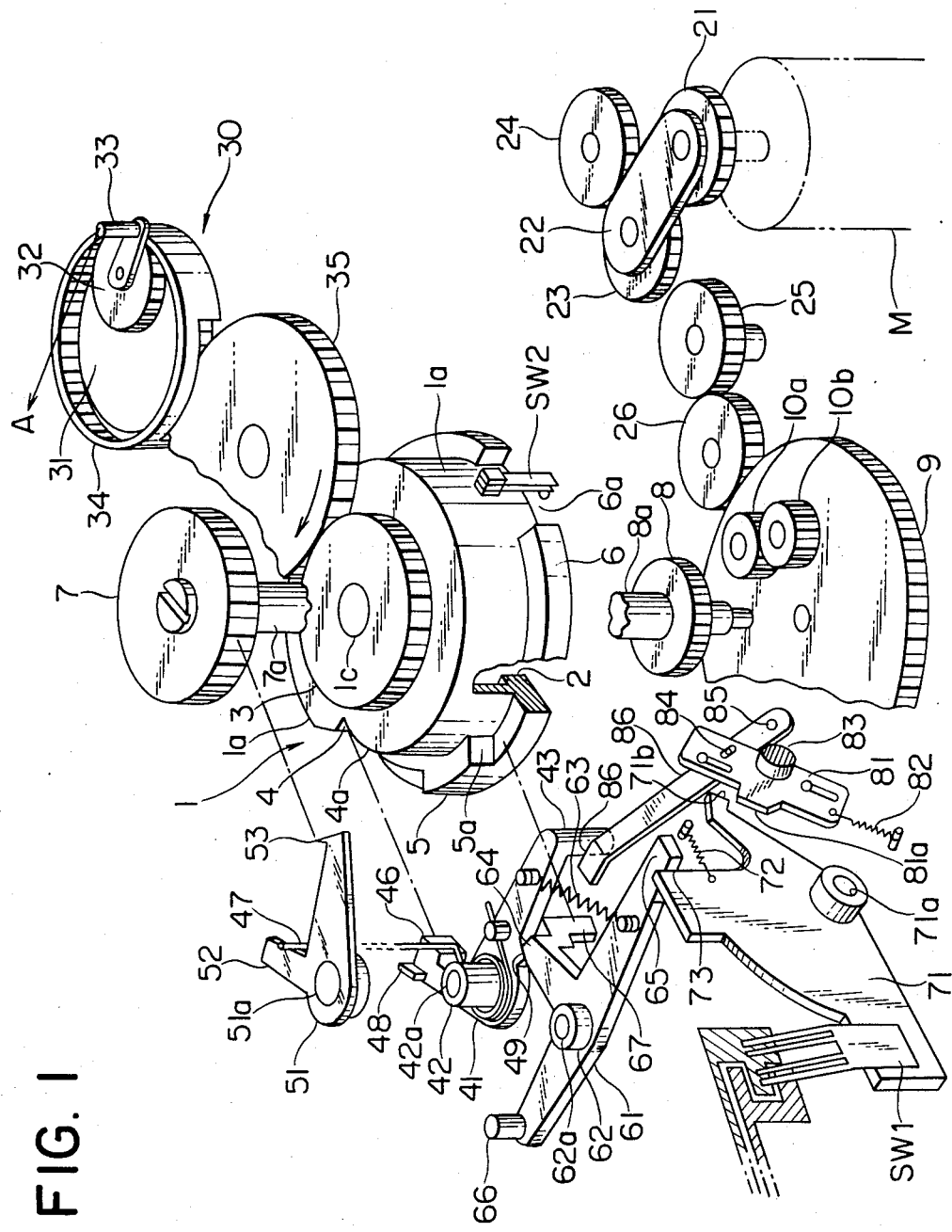
FIG. 1 is a perspective view showing a first example of the drive mechanism of the camera of this invention.

The principal part of the first example of the drive mechanism in the camera of this invention is shown in FIG. 1, wherein 1 is a cam member located in almost the center of the drive mechanism and the bottom thereof is in the open cylinder form, and the bottom end thereof is formed with an internal gear 2, while on the top thereof is provided integrally a gear 3.

The periphery 1a of cam member 1 has on the top stair thereof a step 4 led by the curved face 4a, on the middle stair thereof a cam 5 led by a slant 5a, and on the bottom stair thereof a flange-like cam 6 in line with cam 5, the cam 6 being interrupted by a cut 6a.

Numbered 7 is a gear connected to a second film-transport mechanism such as a film rewind mechanism (not shown), and its shaft 7a is connected, passing through the hole 1c of cam member 1, integrally with the shaft 8a of a gear 8 located underneath cam member 1, and the cam member 1 and gears 7 and 8 are freely rotatably provided on a common shaft.

Underneath the gear 8 is provided a gear 9 also rotatably on the same shaft. A planet gear 10a provided on the gear 9 engages with the internal gear 2, and a planet gear 10b engaging with the planet gear 10a engages with the gear 8.

M is a motor, a power source for the present drive mechanism, and a gear 21 that is provided on the shaft of the motor is constituted so as to engage with a gear 23 with its shaft mounted to a plate 22 that is loosely fitted onto the shaft of the motor, and the gear 23 performs an oscillating motion to switch the transmission of the driving force either to the right gear or to the left gear according to the revolving direction of motor M, thus forming a clutch mechanism comprising such planet gears.

Number 24 is a first film-transport mechanism such as, e.g., a gear connected to a film-wind mechanism (not shown), and 25 and 26 are a group of intermediate gears which, when the above-mentioned clutch is changed, transmits the driving force of motor M to the gear 9.

Number 30 shows a planet gear mechanism that drives the lens. 31 is a gear for transmitting the driving force to the planet gear mechanism 30, and on the gear 31 is provided a rotatably mounted planet gear 32 that has a pin 33 placed above a position corresponding to the pitch circle thereof. On the other hand, the planet gear 32 engages with an internal gear 34 fixed to the camera body and having a pitch circle whose diameter is double that of the planet gear 32. Accordingly, when the gear 31 makes a half revolution by the force from the camera body, the planet gear 32 revolves half round inside the internal gear 34, and at the same time it also makes a half revolution on its axis, so that they give the pin 33 a straight movement in the direction of Arrow A for a distance corresponding to the pitch circle diameter of the internal gear 34.

As a result, the lens barrel connected to the pin 33 travels in the direction of its optical axis, whereby the focal length of the lens is changed.

On the other hand, on the side of the foregoing gear train is provided a stop lever 41 as changeover means for changing the driving force of motor M over to the film wind mechanism or to the lens-moving mechanism in the present drive mechanism, the stop lever 41 being rotatably mounted so as to pivot upon the hole 42a of a fulcrum 42 provided thereon. The stop lever 41 is resiliently biased in the clockwise direction by an extension spring 63 as biasing means that is laid between the lever and a regulating lever 61 as detecting means provided so as to pivot upon the hole 62a of a fulcrum 62 that is on the same level as the stop lever 41, and a stopper 46 as first stopping means provided on the other side of the lever 41 falls in the step 4 of the foregoing cam member 1 to thereby regulate the counterclockwise turn of the lever.

Over the stop lever 41 is provided a ratchet 51 as second stopping means with its hole 51a loosely fitted onto the fulcrum 42 of stop lever 41 and resiliently biased in the counterclockwise direction by a return spring 47, but since the end 52 of ratchet 51 is stopped by and rests against a protrusion 48 located near the stopper 46 of stop lever 41, when the stopper per 46 engages with the step 4 of cam member 1, the claw 53 of ratchet 51 as the changeover member for changing the driving force of motor M from the rewind mechanism to the lens-moving mechanism is placed in a non-engaging position apart from the gear teeth.

On the other hand, the regulating lever 61 comprises the following three functions:

That is, as stated above, the extension spring 63 is laid between regulating lever 61 and stop lever 41, and when the stopper 46 of stop lever 41 engages with the step 4 of cam member 1, the regulating plane 64, as shown in the figure, is in the state of resting against a circular-arc step 49 centering around the hole 42a of stop lever 41 to obstruct the counterclockwise turn of regulating lever 61. Accordingly, as the first function, this-side end 65 obstructs by stopping the side face 53 the turn of a switch-bearing plate 71 that is resiliently biased in the clockwise direction, pivoting upon the hole 71a, by means of an extension spring 72, so that a switch SW1 is kept open.

The second function is such that the regulating lever 61 is turned clockwise by a knob 66 which is a rewind operation member mounted to the inner end of regulating lever 61 and which sticks out of the camera body, whereby the above-mentioned end 65 turns the switch-bearing plate 71 counterclockwise to thereby enable the closing of switch SW1.

The third function is such that the stop lever 41 is forcibly turned counterclockwise by a member that will be mentioned hereinafter and when its stopper 46 is put apart from the periphery 1a of cam member 1, at the angle at this moment the regulating plane 64 of regulating lever 61 disengages from the step 49 of stop lever 41 thereby to be turned counterclockwise to be ready for obstructing the clockwise return of stop lever 41.

Numbered 81 is a slide plate as the lens-moving operation member arranged on the same level as the switch-bearing plate 71, and is slidable off to the upper right against an extension spring 82 by the operation of a knob 83 that sticks out of the external of the camera body, and, since it regulates a lever 86 pivotable upon a fulcrum 85 by a pin 84, turns the lever 86 clockwise and, by its end 86a, turns the stop lever 41 counterclockwise.

In addition, the slide plate 81 has a cam portion 81a that receives the striking portion 71b of switch-bearing plate 71, and, when the slide plate is slided off to the upper right by the operation of knob 83 of slide plate 81, the striking portion 71b is stopped by the cam 81a, whereby the clockwise turn of the switch-bearing plate 71 is tentatively obstructed.

The action of the driving device will now be illustrated below:

FIG. 1 shows that motor M, after completion of a first wind of film, is in the state of revolving in a first direction to perform another wind of film; namely the gear 21 is in the state of turning clockwise and therefore the gear 23 is in the state of engaging with the gear 24 connected to the film-wind mechanism to transmit the driving force to motor M to the film wind mechanism.

Hereupon, the film rewind is performed as follows: After completion of exposures of a given number of film frames, when a further advance of the film is tried, if motor M is stopped without completing another full-frame advance, in the camera of this invention, a given pulse waveform synchronized with the quantity of revolution of the sprocket is not transmitted to the control section, and as a result the control section detect this to control motor M so as to revolve in a second direction; i.e., to have the gear 21 begin rotating counterclockwise.

Consequently, the gear 23 engages with intermediate gear 25 and further through intermediate gear 26 to rotate the gear 9 counterclockwise.

In this instance, the cam member 1 also is subjected by planet gear 10a on gear 9 to a counterclockwise rotating force, but, since it is stopped by the stopper 46 of stop lever 41, the planet gear 10a begins both revolution round and revolution on its axis, and therefore both gear 8 and gear 7 that is connected to the film wind mechanism are to be rotated according to the difference between the counterclockwise rotation round and on the axis of the planet gear 10b.

Thus, upon completion of exposures of film, rewind of the film begins automatically, and the film is returned into its cartridge; i.e., the autoreturn of the film is carried out. On the other hand, however, if it is necessary to have unexposed frames remain inside the camera, the device enables also changing over to manual return of the film.

That is, when the knob 66 is pressed rightward to turn the control lever 61 clockwise to thereby turn the switch-bearing plate 71 counterclockwise to close switch SW1, even if the condition is ready for automatic film wind, a circuit for reversing motor M is formed to cause the same operation as in the foregoing autoreturn to thereby drive the gear 7 to enable manual rewind of the film.

In driving the lens-moving mechanism, if the slide plate 81 is slided off to the upper right by the knob 83, the lever 86 is turned clockwise to cause its end 86a to press the changeover pin 43 of stop lever 41 rightward to turn the stop lever counterclockwise. As a result, firstly, in the stop lever 41, the stopper 46 leaves the periphery 1a of cam member 1 to break off its stopping relation with cam member 1.

At the same time, the ratchet 51, because the contact therewith by the protrusion 48 of stop lever 41 is released, follows the stop lever 41 to turn counterclockwise by the action of return spring 47 and its claw 53 then engages with or is ready to engage with one of the teeth of gear 7.

Subsequently, in the regulating lever 61, since its regulating plane 64 disengages from the step 49 of stop lever 41, is turned counterclockwise by the action of extension spring 63, and, because its end 65 moves rightward, the switch-bearing plate 71 is about to turn clockwise by the action of extension spring 72.

However, when the slide plate 81 is slided off to the upper right, the striking portion 71b of switch-bearing plate 71 is in the position to be obstructed by the cam 81a of slide plate 81, so that the switch-bearing plate 71 does not turn, and therefore the switch SW1 is in the state of being still kept open.

Next, when the knob 83 is released, the slide plate 81 and lever 86 are about to return to the position as shown in the figure, but prior to that, the stop lever 41 is already in the state of having its return obstructed by the regulating plane 64 of regulating lever 61 that has disengaged from the step 49, and the regulating lever 61 itself also is in the state of being unable to return to the position as shown in the figure by the engagement thereof with stop lever 41.

Accordingly, upon return of the slide plate 81, the switch-bearing plate 71 turns clockwise to close the switch SW1 to form a circuit for reversing motor M to thereby transmit the driving force of motor M through intermediate gears 25 and 26 to gear 9.

In this instance, because the gear 7 connected to the film rewind mechanism is already stopped by ratchet 51, the cam member 1 is set to rotate counterclockwise according to the difference between the revolution round and revolution on the axis of the planet gear 10a on gear 9.

Upon the start of the rotation of cam member 1, the bottom cam 6 acts upon the switch SW2 connected in parallel with the switch SW1 to close the same, and then the slant 5a of the middle stair pushes up the regulating pin 67 of regulating lever 61 to slightly turn the regulating lever clockwise, so that the regulating plane 64 comes into contact again with the step 49 of stop lever 41.

As a result, the stop lever 41 turns clockwise by the action of extension spring 63, but at this moment, the cam member 1 is already in the course of rotating, so that the stopper 61 of stop lever 41 is on the periphery 1a of cam member 1, and does not engage again with the low 4 of cam member 1.

And, by the return of regulating lever 61 the switch-bearing plate 71 also returns to open the switch SW1, but because the switch SW2 is kept closed by cam 6, the driving force of motor M is continued to be transmitted to the cam member 1.

Thus, when the cam member 1 driven by motor M completes almost its one revolution, the switch SW2 falls in the cut 6a of cam 6 to become open and thus the drive of motor M is stopped, but during the one revolution of cam member 1 the gear 3, through intermediate gear 35, causes the gear 31 to make a half revolution, and as has been stated earlier, the planet gear 32 revolves round and on its axis to move straight the pin 33 provided to the planet gear 32 in the direction of Arrow A to thereby drive the lens-moving mechanism.

In this instance, the action timing of the switch SW2 is set so that the stopper 46 of stop lever 41 does not reach the curved face 4a of cam member 1 but stops at the position where it is slidably contacted with the periphery 1a, thereby keeping the stopping condition of the gear 7 by the claw 53.

That is, the above condition implies that the focal length of the taking lens has been changed. In order to restore the focal length to the original state, the foregoing knob 83 should be operated to repeat similar manners.

In addition, when the cam member 1 opens the switch SW1 and stops, its stop position inevitably slightly gets out of place by inertia or something and further, when winding film again, until the stopper 46 of stop lever 41 engages with the low 4 of cam member 1, the cam member 1 continues its rotation to give a useless effect upon the lens-moving mechanism, but in any of the cases, a trouble-free lens operation can be carried out by setting the movement of the pin 33 to be larger than the movement of the lens and by adopting such the construction that the driving force is transmitted through an elastic member to the lens-moving mechanism, the elastic member being capable of absorbing an excessive movement of the pin 33.

As is apparent from the above description, the camera of this invention is so constructed that the changeover to the normal or reverse revolution of the motor and the changeover of the driving force transmission path in the planet gear mechanism driven by this motor enable the obtaining of the driving force for the wind and rewind of film and for the lens movement from the same single motor. The structure of the camera is significantly simple and reasonable as compared to conventional cameras, and is deemed to be very useful for designing and also for producing small-sized cameras.

Other effects of the present invention are as follows:

The foregoing switch SW1 used in this invention, as shown in the drawing, is so constructed as to form a circuit which, whether it is slided upward or downward, has motor M revolve in the second direction; that is, the circuit transmits the motor's driving force to the gear 9.

Therefore, if the foregoing knob 66, the film-rewind operation member, is arbitrarily used to turn the regulating lever 61 clockwise, its end 65 presses and turns the switch-bearing plate 71 counterclockwise to close the switch SW1, whereby the rewind of film can be performed at any time, and on the other hand, if the slide plate 81 is reciprocated diagonally upper rightward, then the switch SW1 is closed likewise, and the motor M's driving force can be transmitted to the lens-moving mechanism.

Namely, the present invention is so constructed that both film rewind and lens-moving operations can be carried out by proper use of a same single switch SW1, and as a result, despite of enabling the arbitrary rewind of film, the construction requires no supplementary switches nor spacing therefor.

Also, in the present invention, even when the motor M comes into revolving in the second direction to transmit its driving force to the gear 9 by the action of switch SW1 due to the operation of the foregoing knob 66, since the extension spring 63 as biasing means is provided between the stop lever as changeover means and the regulating lever 61 to thereby always resiliently biasing the stop lever 41 in the counterclockwise direction, the stopper 46 continues its position to detain or stop the cam member 1.

Consequently, the motor M's driving force that has been transmitted to the gear 9, as has been stated, is transmitted through planet gears 10a and 10b to the gears 8 and 7, and immediately after that, the rewind of film begins automatically to urge the user to replace the film.

In addition, the foregoing drive mechanism may also be constructed by exchanging the positions of the film-wind mechanism and rewind mechanism. In that case, the gear 7 is to be connected to the film-wind mechanism, and the film-wind operation is to be made by the engagement of stop lever 41 with cam member 1. Also in this case, because the extension spring as biasing means works, the stop lever 41 is always detaining the cam member 1 to be ready to transmit the driving force of motor M to the film wind-mechanism at any time.

Also, in this invention, in the stage where the slide plate 81 as a lens-moving operation member is operated to be slided off to the upper right, in the lens-moving device, the ratchet 51 engages with the gear 7 to regulate the rotation thereof, and the stop lever 41 as a changeover member disengages from the cam member 1, whereby the device is ready to transmit the driving force of motor M to the lens-moving mechanism, and on the other hand, with the operation of the stop lever 41, the regulating lever 61 as means of detecting the changeover member turns to keep the condition of the stop lever 41 being disengaged from the cam member 1 and simultaneously to release the detention of the switch-bearing plate 71. As stated above, however, because the turn of the switchbearing plate 71 is obstructed by the slide plate 81, the switch SW1 is not closed to thereby have the motor M remain unrevolving.

That is, in this invention, the advance operation of the slide plate 81 effects the mechanical connection for transmission of the driving force to the lens-moving mechanism, and then the actual transmission of the driving force is carried out upon the start of the revolution of motor M by the return operation of the slide plate 81.

Accordingly, no adjustment is required for the operation timing that is necessary in performing by the advance operation alone both the foregoing mechanical connection and the operation of the switch SW1, and in addition it enables to be free from the disadvantage of possible consecutive-lens-movement trouble by careless handling.

Further, in this invention, in the stage of the advance operation of the slide plate 81, even if the camera is shocked to cause the stop lever 41 to disengage from the regulating lever 61, since the regulating lever 61 restores the switch SW1 to its open condition, the motor M does not operate, thus preventing the camera from the accidental rewind trouble that may occur in such cases.

In addition, in the above-described example, the revolution of the motor in the first direction effects the wind of film, while the revolution in the second direction effects the rewind of film or lens movement, but there may also be adopted such a construction that the film rewind or lens movement is effected by the revolution in the first direction and the film wind is effected by the revolution in the second direction. Such a construction can be accomplished by connecting the wind mechanism to the gear 7 and connecting the rewind mechanism to the gear 24.

Figure 2:
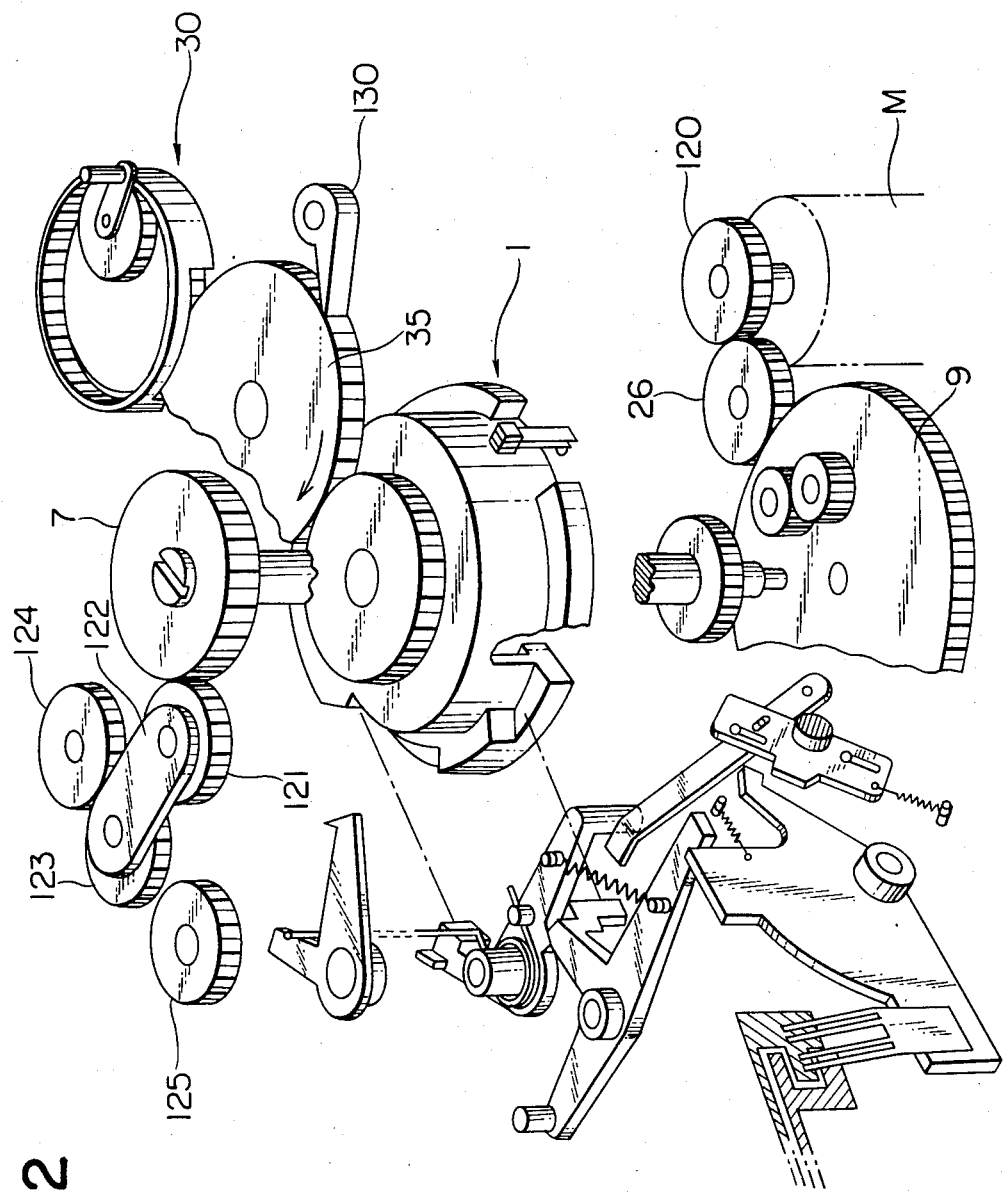
FIG. 2 is a perspective view showing a second example of the camera of this invention.

FIG. 2 shows a second example of the present invention, wherein the gear 120 of motor M is connected through an intermediate gear 26 to the gear 9, and the gear 7 that shares the common shaft with the gear 9 is provided with a clutch comprising planet gears 121, 123, 124 and 125 and a plate 122 which have quite the same functions as the foregoing gears 21, 23, 24 and 25 and plate 22, respectively. Since the gear 121 engages with the gear 7 that is normally/reversely rotated by motor M, by changing the revolution direction of motor M, the driving force thereof is transmitted by the gear 124 to the film-wind mechanism or by the gear 125 to the film-rewind mechanism.

In this instance, in order to prevent the reverse rotation of cam member 1, for example, an antireverse rotation means 130 made of an elastic material is provided which is resiliently biased in the direction for stopping the gear 35.

The second example has been described above, referring to only those numbered otherwise differing from the first example. The present invention, illustrated by making reference to the above examples accomplishes the wind/rewind of film and automation of the lens movement in a small-sized camera by a very simple and rational device, whereby the automatic start of the rewind of film becomes also possible to thus provide a fullautomatic camera that is very easily usable also by any beginners.

What is claimed is:

1. A camera comprising a motor, a first changeover mechanism, and a second changeover mechanism,
    said first changeover mechanism transmitting the driving force of said motor to a first film-transport mechanism during the revolution of said motor in a first direction and transmitting said driving force of said motor to a second film-transport mechanism or to a taking lens-moving mechanism during said revolution of said motor in a second direction,
    said second changeover mechanism being capable of arbitrarily changing the transmission of said driving force of said motor during the revolution thereof in said second direction either over to said second film-transport mechanism or over to said lens-moving mechanism,
    said first changeover mechanism and said second changeover mechanism being used for the selective changeover of the first film-transport operation, second film-transport operation and taking lens-moving operation by said motor.

2. The camera of claim 1, wherein said first film-transport mechanism is a film-wind mechanism, and said second film-transport mechanism is a film-rewind mechanism, and said second film-transport mechanism is a film-wind mechanism.

3. The camera of claim 2, wherein said second changeover mechanism is so constructed as to transmit said driving force of said motor to said film-rewind mechanism, and said second changeover mechanis, only when the movement of said taking lens is selected, transmits said driving force of said motor to said taking lens-moving mechanism.

4. The camera of claim 3 wherein said second changeover mechanism, after completion of a specified operation of said lens-moving mechanism by said driving force of said motor, changes automatically the transmission of said driving force of said motor over to said film-rewind mechanism.

5. The camera of claim 2, wherein said second changeover mechanism is a planet gear mechanism.

6. The camera of claim 5 wherein said planet gear mechanism comprises at least
a rotating member to which is transmitted said driving force of said motor,
at least one revolving-round gear which is on said rotating member and which is rotatably fixedly provided apart from the axis of said rotating member,
an internal gear which engages with said revolving-round gear and which is rotatable on the same axis as that of said rotating member, and
a gear which engages with said revolving-round gear and which is rotatable on the same axis as that of said rotating member.

7. The camera of claim 6, wherein said internal gear is connected to said lens-moving mechanism, and said gear is connected to said film-rewind mechanism.

8. The camera of claim 7, wherein said planet gear mechanism has a first stopping means and a second stopping means, and transmits said driving force of said motor to said filmrewind mechanism under the condition of said first stopping means being in the stopping position thereof, and transmits said driving force of said motor to said lens-moving mechanism under the condition of said second stopping means being in the stopping position thereof.

9. The camera of claim 8, wherein said first stopping means operates so as to obstruct the rotation of said internal gear, and said second stopping means operates so as to obstruct the rotation of said gear.

10. The camera of claim 9, wherein said first stopping means is provided being so resiliently biased as to obstruct the rotation of said internal gear.

11. The camera of claim 10, wherein said second stopping means operates only when the operation of said first stopping means is released.

12. The camera of claim 5, wherein said planet gear mechanism comprises at least
a rotating member to which is transmitted said driving force from said motor,
a first revolving-round gear which is on said rotating member and which is rotatably fixedly provided apart from the axis of said rotating member,
a second revolving-round gear which is connected to said first revolving-round gear and which is rotatably fixedly provided apart from the axis of said rotating member,
a first gear which engages with said first revolving-round gear and which is rotatable on the same axis as that of said rotating member, and
a second gear which engages with said second revolving-round gear and which is rotatable on the same axis as that of said rotating member.

13. The camera of claim 1, wherein said first film-transport mechanism is a film-rewind mechanism, and said second film-transport mechanism is a film-wind mechanism .

14. The camera of claim 1, wherein said taking lens-moving mechanism comprises
a fixedly provided internal gear,
a rotating member rotatable on the center of said internal gear by said driving force of said motor,
a gear engaging with said internal gear and rotatably provided in a given position on said rotating member having a pitch circle whose diameter is one half ($\frac{1}{2}$) of that of said internal gear, and
a lens-driving member which is fixedly provided above said pitch circle of said gear and which travels straight in the direction of the optical axis of said taking lens.

15. A camera comprising a motor, a changeover mechanism and switch means,
said changeover means transmitting selectively the driving force of said motor to a film-wind mechanism and a film-rewind mechanism or to a lens-moving mechanism,
said switch means letting said motor drive said film-rewind mechanism to perform the rewind of film or drive said lens-moving mechanism to perform the movement of the lens, said switch means being turned ON either by a film-rewind operation member or by a lens-moving operation member.

16. The camera of claim 15, wherein said camera comprises further a second switch means in parallel with said switch means, said second switch means being turned ON upon the start of the movement of the taking lens by turning said switch ON and being turned OFF upon completion of said movement of said taking lens.

17. In a camera in which the film-wind and film-rewind operations and taking lens-moving operation are performed by a same motor,
said camera comprising
a lens-moving operation member which reciprocates to perform said lens-moving operation,
a switch member which starts said motor, and
a changeover mechanism which transmits selectively the driving force of said motor to a film-wind mechanism or film-rewind mechanism and lens-moving mechanism,
said lens-moving operation member, in the advance operation thereof, actuating said changeover mechanism to thereby enable said driving force of said motor to be transmitted to said lens-moving mechanism and, in the return operation thereof, turning said switch member ON to drive said motor to perform said lens-moving operation.

18. The camera of claim 17, wherein said changeover mechanism has a switch member regulating means which interlockes therewith and which releases the detention of said switch member when said changeover mechanism changes to perform said lens-moving operation, said switch member regulating means enabling said switch member to be turned ON, and said lens-moving member has a cam which, at the time of the return operation of said lens-moving operation member, turns said switch member ON.

* * * * *